United States Patent
Murao

(10) Patent No.: US 10,122,877 B2
(45) Date of Patent: Nov. 6, 2018

(54) IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hidetoshi Murao, Mishima Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/384,492

(22) Filed: Dec. 20, 2016

(65) Prior Publication Data

US 2018/0176402 A1 Jun. 21, 2018

(51) Int. Cl.
| | |
|---|---|
| H04N 1/00 | (2006.01) |
| H04N 1/393 | (2006.01) |
| H04N 1/387 | (2006.01) |
| G06T 17/00 | (2006.01) |

(52) U.S. Cl.
CPC ......... *H04N 1/00827* (2013.01); *G06T 17/00* (2013.01); *H04N 1/3872* (2013.01); *H04N 1/393* (2013.01); *G06T 2200/08* (2013.01); *H04N 2201/0081* (2013.01); *H04N 2201/0082* (2013.01); *H04N 2201/0094* (2013.01)

(58) Field of Classification Search
CPC .. H04N 1/00827; H04N 1/3872; H04N 1/393; H04N 2201/0082; H04N 2201/0081; H04N 2201/0094; G06T 17/00; G06T 2200/08

USPC ........................................................ 358/1.14
See application file for complete search history.

(56) References Cited

U.S. PATENT DOCUMENTS

| | | | | |
|---|---|---|---|---|
| 5,832,325 | A * | 11/1998 | Ito | G03B 35/08 |
| | | | | 348/E13.014 |
| 5,905,501 | A * | 5/1999 | Kato | G06T 15/00 |
| | | | | 345/419 |
| 2015/0204663 | A1 | 7/2015 | Znamenskiy et al. | |
| 2016/0368220 | A1* | 12/2016 | Dimatteo | B29C 67/0088 |

* cited by examiner

*Primary Examiner* — Neil R McLean
*Assistant Examiner* — Darryl V Dottin
(74) *Attorney, Agent, or Firm* — Amin, Turocy & Watson LLP

(57) ABSTRACT

An image forming apparatus comprises a three-dimensional reader, a drawing data generator and a printer. The three-dimensional reading section includes an arrangement section, a sensor and a model data generator. The arrangement section is a position where a target object is arranged. The sensor acquires three-dimensional information relating to a three-dimensional shape of the object arranged on the arrangement section. The model data generator generates three-dimensional model data indicating the three-dimensional shape of the object on the basis of the three-dimensional information. The drawing data generator generates drawing data containing data of a two-dimensional drawing formed by projecting the object on a plane surface on the basis of the three-dimensional model data. The printer forms an image on a sheet on the basis of the drawing data.

20 Claims, 9 Drawing Sheets

IMAGE FORMING APPARATUS

FIELD

Embodiments described herein relate generally to an image forming apparatus and methods related thereto.

BACKGROUND

A three-dimensional scanner acquires three-dimensional coordinate data (X, Y, Z) of a plurality of points on a surface of a target object and generates point group data which is an aggregation of the acquired coordinate data. Recently, there is a device which generates the point group data of the target object arranged on a stand without attaching a marker to the target object.

However, there is a problem that the application of a three-dimensional scanner is limited and is not fully widespread.

DETAILED DESCRIPTION

Figure 1:
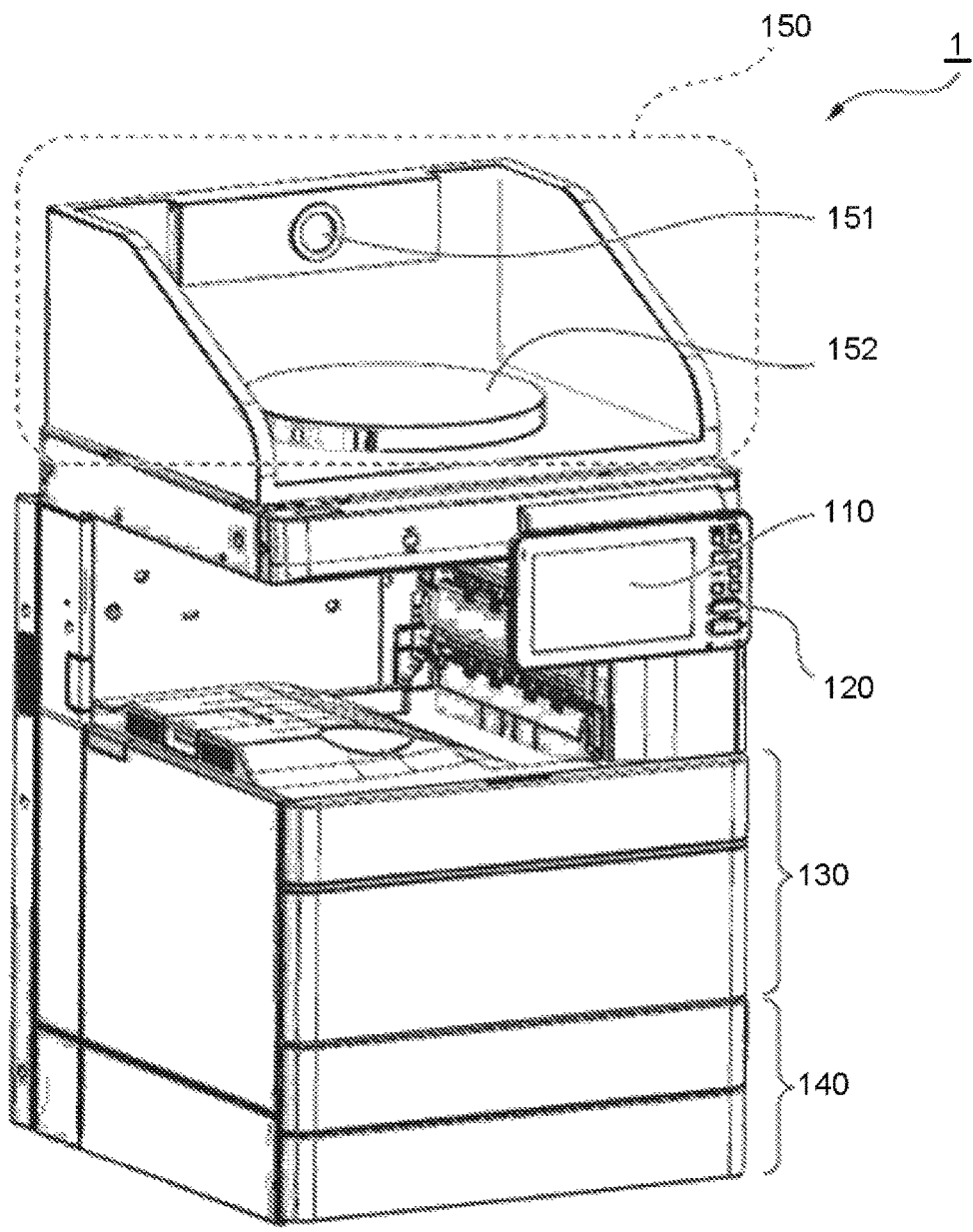
FIG. 1 is a diagram illustrating an example of the whole configuration of an image forming apparatus 1 according to a first embodiment.

In accordance with an embodiment, an image forming apparatus comprises a three-dimensional reader, a drawing data generator and a printer. The three-dimensional reader includes an arrangement section, a sensor and a model data generator. The arrangement section is a position where a target object is arranged. The sensor acquires three-dimensional information relating to a three-dimensional shape of the object arranged on the arrangement section. The model data generator generates three-dimensional model data indicating the three-dimensional shape of the object on the basis of the three-dimensional information. The drawing data generator generates drawing data which is data of a two-dimensional drawing formed by projecting the object on a plane surface on the basis of the three-dimensional model data. The printer forms an image on a sheet on the basis of the drawing data.

In accordance with another embodiment, an image forming method involves acquiring three-dimensional information relating to a three-dimensional shape of a target object; generating three-dimensional model data indicating the three-dimensional shape of the target object on the basis of the three-dimensional information; generating drawing data comprising data of a two-dimensional drawing formed by projecting the target object on a plane surface on a basis of the three-dimensional model data; and forming an image on a sheet on the basis of the drawing data.

First Embodiment

Hereinafter, the image forming apparatus 1 of the first embodiment is described with reference to the accompany drawings. FIG. 1 is a diagram illustrating an example of the whole configuration of the image forming apparatus 1 according to the first embodiment. The image forming apparatus 1 is, for example, a multifunction peripheral. The image forming apparatus 1 comprises a display 110, a control panel 120, a printer section 130, a sheet housing section 140 and a three-dimensional reading section 150. The three-dimensional reading section 150 includes a sensor 151 and a stand 152. Furthermore, the printer section 130 of the image forming apparatus 1 may be a device for fixing a toner image or an inkjet type device.

The image forming apparatus 1 forms an image on a sheet with a developing agent such as toner. The sheet is, for example, a paper or a label paper. The sheet may be an optional article as long as the image forming apparatus 1 can form an image on the surface thereof.

The display 110 is an image display device such as a liquid crystal display, an organic EL (Electro Luminescence) display and the like. The display 110 displays various information relating to the image forming apparatus 1. The display 110 is a form of a display section.

The control panel 120 includes a plurality of buttons. The control panel 120 receives an operation of a user. The control panel 120 outputs a signal in response to the operation executed by the user to a controller 170 of the image forming apparatus 1. Further, the display 110 and the control panel 120 may be integrally configured as a touch panel. The touch panel is a form of an operation section.

The printer section 130 forms an image on the sheet based on image information generated by an image reading section 160 or the controller 170 or image information received via a communication path. The printer section 130 forms the image through the following processing, for example. An image forming section of the printer section 130 forms an electrostatic latent image on a photoconductive drum based on the image information. The image forming section of the printer section 130 forms a visible image by attaching a develop agent to the electrostatic latent image. As a concrete example of the developing agent, the toner is exemplified. A transfer section of the printer section 130 transfers the visible image onto the sheet. A fixing section of the printer section 130 fixes the visible image on the sheet through heating and pressuring the sheet. Further, the sheet on which the image is formed may be a sheet housed in the sheet housing section 140 or a manually fed sheet.

The sheet housing section 140 houses the sheet used for the image formation in the printer section 130.

The three-dimensional reading section 150 generates three-dimensional model data from an object arranged on the stand 152. The three-dimensional reading section 150 may be integrated with the image forming apparatus 1. In this case, the three-dimensional reading section 150 rotationally moves upward along an axis arranged at the back surface of the image forming apparatus 1. The three-dimensional reading section 150 may be detachable from the image forming apparatus 1.

The sensor 151 acquires information relating to a three-dimensional shape of the object arranged on the arrangement section 152. The sensor 151 may include a distance sensor capable of measuring a distance from the sensor 151 to each point on the surface of the object. The sensor 151 may be composed of a plurality of cameras positioned separately. The sensor 151 is, for example, arranged at the upper part of the three-dimensional reading section 150 as shown in FIG. 1. The sensor 151 outputs the information relating to the three-dimensional shape of the object arranged on the arrangement section 152 to a model data generation section 153. The information relating to the three-dimensional shape may be, for example, distance information measured by the distance sensor. The information relating to the three-dimensional shape may be, for example, images captured by a plurality of cameras having different visual points.

The object which is a measurement target of the three-dimensional shape is arranged on the arrangement section 152. The arrangement section 152 may be constituted, for example, as a pedestal-like stand or a plane area, or may be formed into other shapes. In the following description, an example in which the arrangement section 152 is constituted as the stand 152 is described. The stand 152 is constituted with a pedestal such as a table. The stand 152 is arranged, for example, in an image capturing direction of the sensor 151. The stand 152 may be rotated clockwise or counter-clockwise.

Figure 2:
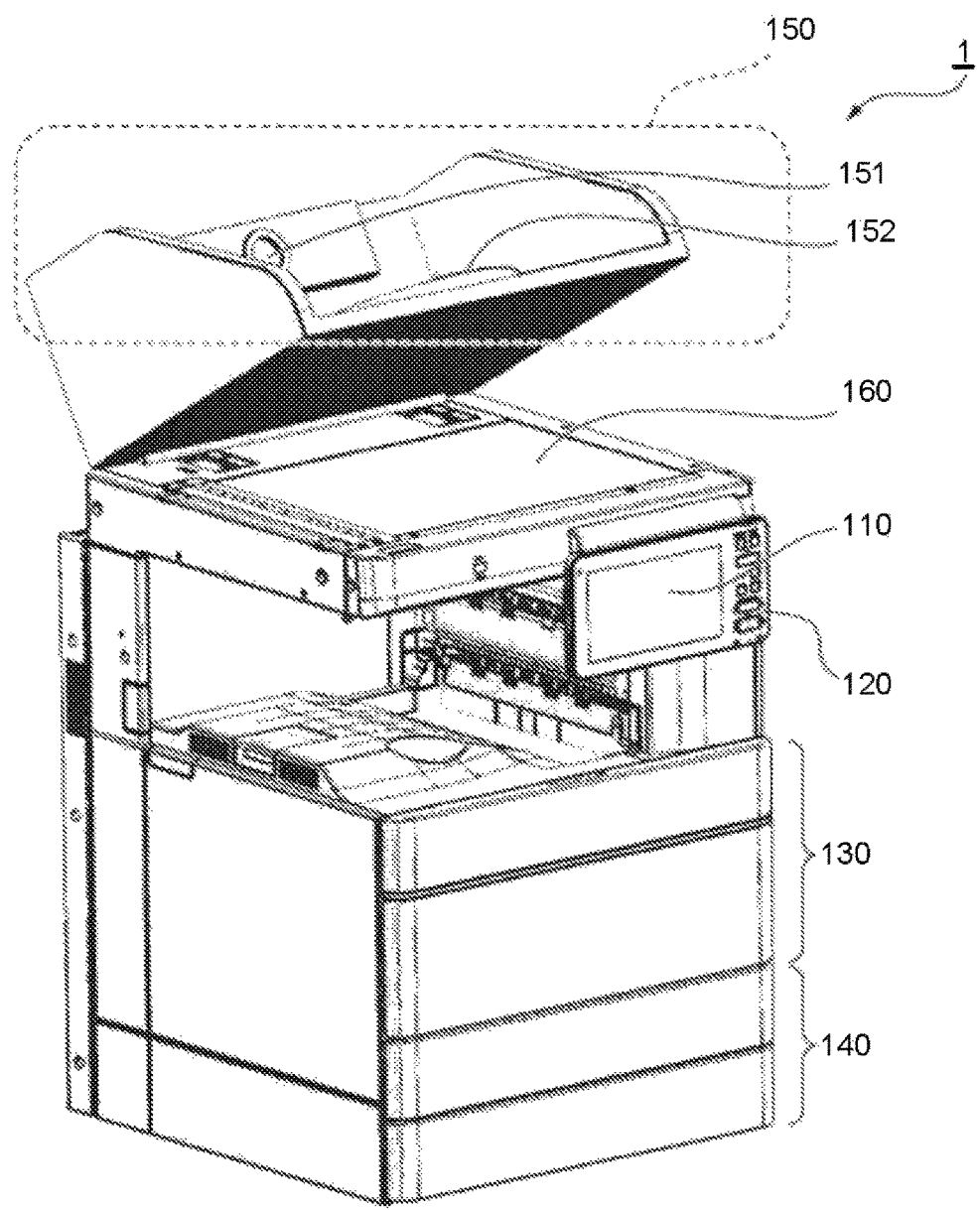
FIG. 2 is a diagram illustrating an example of the whole configuration of the image forming apparatus 1 according to the first embodiment in a state in which a three-dimensional reading section 150 is rotationally moved upward.

FIG. 2 is a diagram illustrating an example of the whole configuration of the image forming apparatus 1 according to the first embodiment in a state in which the three-dimensional reading section 150 is rotationally moved upward. The image forming apparatus 1 comprises the image reading section 160.

The image reading section 160 reads the image information serving as a reading target as the intensity of light. The image reading section 160 records the read image information. The recorded image information may be sent to another information processing apparatus via a network. The recorded image information may be used to form an image on the sheet by the printer section 130.

Figure 3:
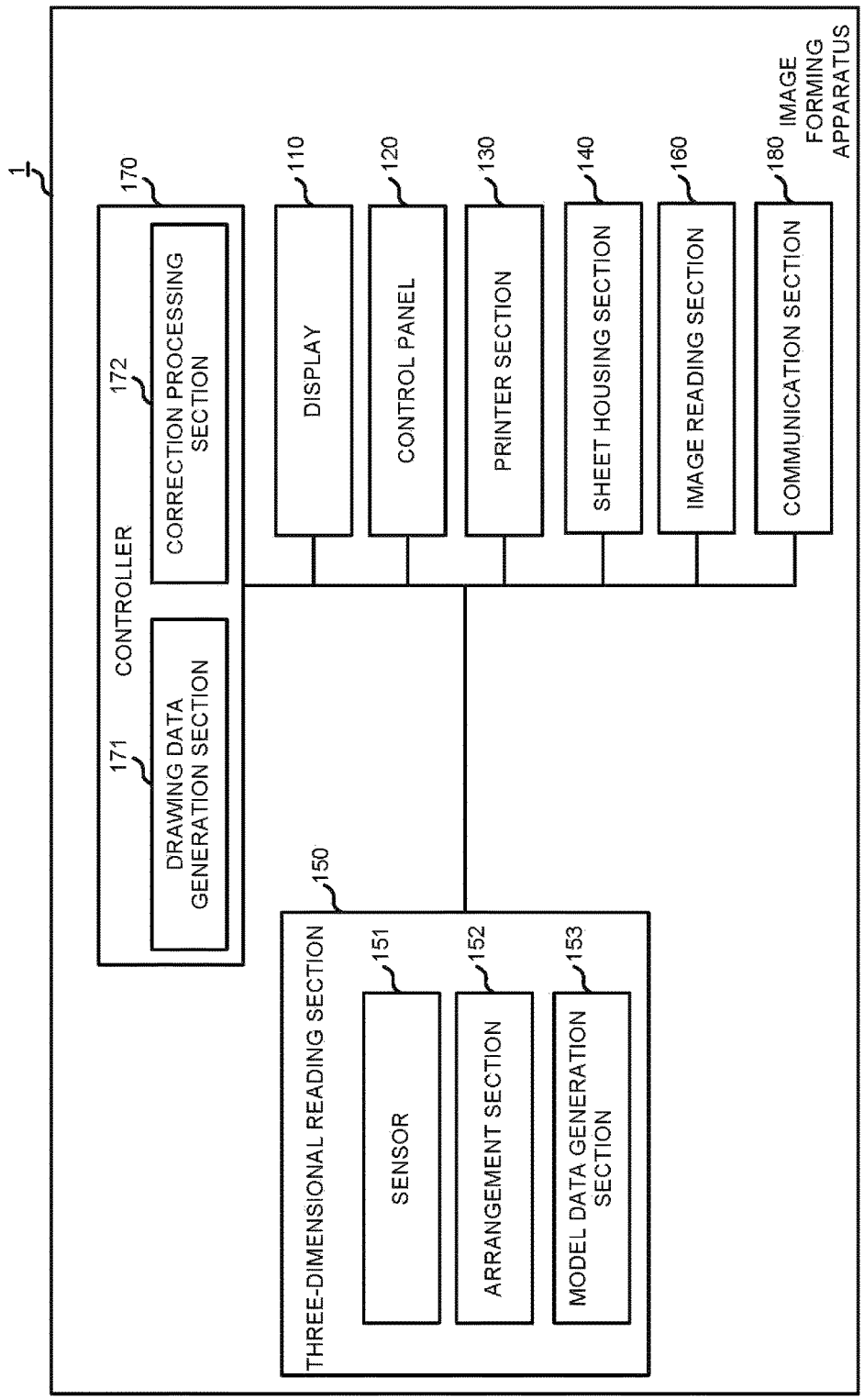
FIG. 3 is a block diagram illustrating an example of functional components of the image forming apparatus 1 according to the first embodiment.

FIG. 3 is a block diagram illustrating an example of functional components of the image forming apparatus 1 according to the first embodiment. The image forming apparatus 1 comprises the display 110, the control panel 120, the printer section 130, the sheet housing section 140, the three-dimensional reading section 150, the image reading section 160, the controller 170 and a communication section 180. The three-dimensional reading section 150 includes the sensor 151, the arrangement section 152 and the model data generation section 153. The configurations of the display 110 to the image reading section 160, and the configurations of the sensor 151 and the arrangement section 152 are as stated above, and thus the description thereof is omitted.

The model data generation section 153 generates the three-dimensional model data on the basis of the information relating to the three-dimensional shape. The three-dimensional model data indicates the three-dimensional shape of the object by using points or surfaces. The three-dimensional model data is, for example, point group data and polygon data. The point group data indicates the shape of the surface of the object with a plurality of points. The polygon data is data such as an STL (Standard Triangulated Language) indicating the shape of the surface of the object with a plurality of surfaces.

The controller 170 controls an operation of each section of the image forming apparatus 1. The controller 170 is, for example, a device including a CPU (Central Processing Unit) and a RAM (Random Access Memory). The controller 170 functions as a drawing data generation section 171 and a correction processing section 172 through executing a drawing data generation program. The controller 170 may execute a print instruction for magnifying or minifying the drawing data at predetermined magnification.

The drawing data generation section 171 generates the drawing data on the basis of the three-dimensional model data generated by the model data generation section 153. The drawing data is data of a two-dimensional plan figure generated by projecting the three-dimensional shape indicated by the three-dimensional model data onto a plane surface. The drawing data may contain data of a plurality of plan figures. For example, the drawing data may include a plan figure in response to a reference direction selected from a plurality of candidate directions and a plurality of plan figures in response to other candidate directions. The candidate directions are a plurality of directions decided on the basis of three-dimensional coordinate axes. The reference direction is one direction selected from a plurality of candidate directions. The three-dimensional coordinate axes are composed of three straight lines mutually orthogonal to one another. The drawing data generation section 171 may add dimension information indicating dimension of the object with respect to the plan figure. The dimension information may be acquired on the basis of the three-dimensional model data.

The correction processing section 172 executes a correction processing to the three-dimensional model data. The correction processing is a processing of correcting deviation of a position or an angle of the object generated at the time of generating the three-dimensional model data. The correction processing may be, for example, a processing of rotationally moving the three-dimensional model data by a predetermined angle centering on one axis of the three-dimensional coordinate axes. The predetermined angle is, for example, 1 degree. The predetermined angle may be any degrees. The correction processing may be, for example, a processing of selecting one plane surface among the plane surfaces constituted by selecting two axes from the three-dimensional coordinate axes by a user and moving the selected surface in such a manner that the selected surface contacts with the surface of the three-dimensional model data. The correction processing section 172 may execute the correction processing on the basis of an operation received form the control panel 120.

The communication section 180 is a network interface. The communication section 180 is connected with other information processing apparatuses in a communicable manner via a communication line or channel, and the communication can be carried out in a hardwired or wireless manner. The communication section 180 may send, for example, the three-dimensional model data and the drawing data. The information processing apparatus is, for example, a personal computer, a smart phone, a tablet computer or a server.

Figure 4:
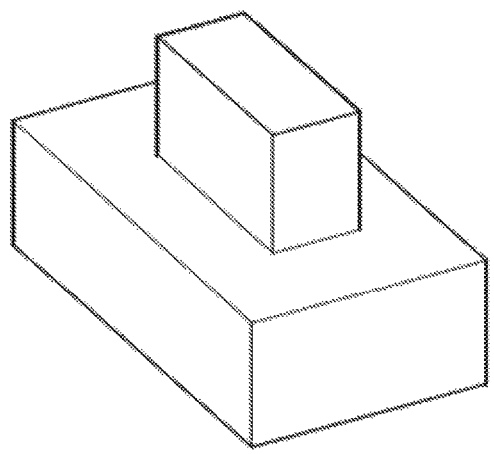
FIG. 4 is a diagram illustrating one concrete example of an object arranged on a stand 152.

FIG. 4 is a diagram illustrating one concrete example of the object arranged on the stand 152. Hereinafter, the image forming apparatus 1 of the first embodiment is described by using the object shown in FIG. 4.

Figure 5:
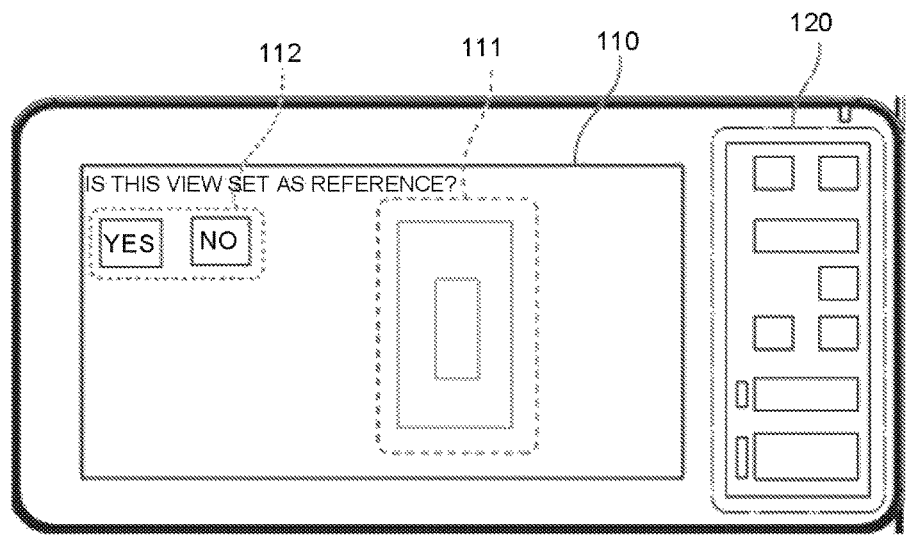
FIG. 5 is a diagram illustrating a concrete example of an image displayed on a display 110 at the time of deciding a reference direction.

FIG. 5 is a diagram illustrating a concrete example of an image displayed on the display 110 at the time of deciding the reference direction. 111 in FIG. 5 is an image of the three-dimensional model data displayed on the basis of one selected candidate direction. 112 in FIG. 5 is an image for the user to decide whether or not the image shown in 111 in FIG. 5 is set as the reference direction. In a case in which the image shown in 111 in FIG. 5 is set as the reference direction, the user operates the control panel 120 to select YES. On the other hand, in a case in which the image shown in 111 in FIG. 5 is not set as the reference direction, the user operates the control panel 120 to select NO. If NO is selected, the image displayed in 111 in FIG. 5 is switched to an image of the three-dimensional model data displayed from a different candidate direction. Furthermore, the images shown in FIG. 5 are only concrete examples. Thus, an image may be constituted in a form different from that in FIG. 5. For example, all the images displayed from all the candidate directions may be displayed on the display 110 and one reference direction is selected from those displayed images. For example, the user may execute the correction processing through operating the control panel 120.

Figure 6:
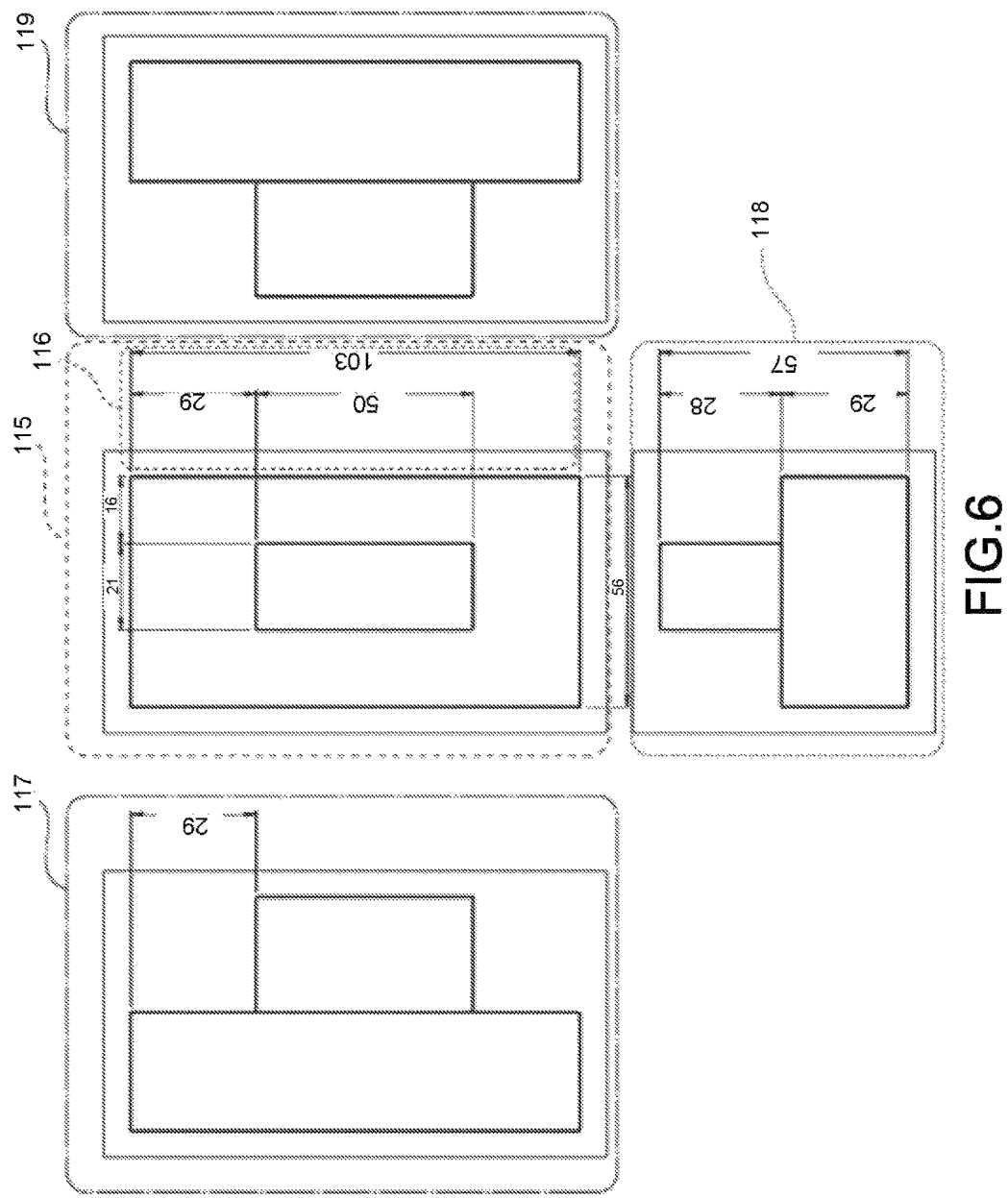
FIG. 6 is a diagram illustrating a concrete example of a drawing formed by a printer section 130.

FIG. 6 is a diagram illustrating a concrete example of a drawing formed by the printer section 130. 115 in FIG. 6 is a drawing generated by forming the three-dimensional model data from the reference direction. 116 in FIG. 6 is the dimension of the three-dimensional model data. The dimension is calculated on the basis of the dimension information included in the three-dimensional model data. The dimension is also calculated in drawings formed from other directions as shown in 117 in FIGS. 6 and 118 in FIG. 6. 117 in FIG. 6 is a drawing generated by forming the three-dimensional model data from a left side surface direction with respect to the reference direction. 118 in FIG. 6 is a drawing generated by forming the three-dimensional model data from a bottom direction with respect to the reference direction. 119 in FIG. 6 is a drawing generated by forming the three-dimensional model data from a right side surface direction with respect to the reference direction. The printer section 130 may form an image by scaling the image at the time of forming the image. The scale may be optional magnification such as magnification (half, one fifth and the like) conforming to a JIS standard, for example. The printer section 130 may form the image by enlarging the image at the time of forming the image. The enlargement may be executed at optional magnification (twice, five times and the like) conforming to the JIS standard, for example. Furthermore, the drawings shown in FIG. 6 are only concrete examples. Thus, the drawings may be constituted in forms different from those in FIG. 6. For example, the formed drawings may include a drawing generated by forming the three-dimensional model data from a back surface direction with respect to the reference direction.

Figure 7:
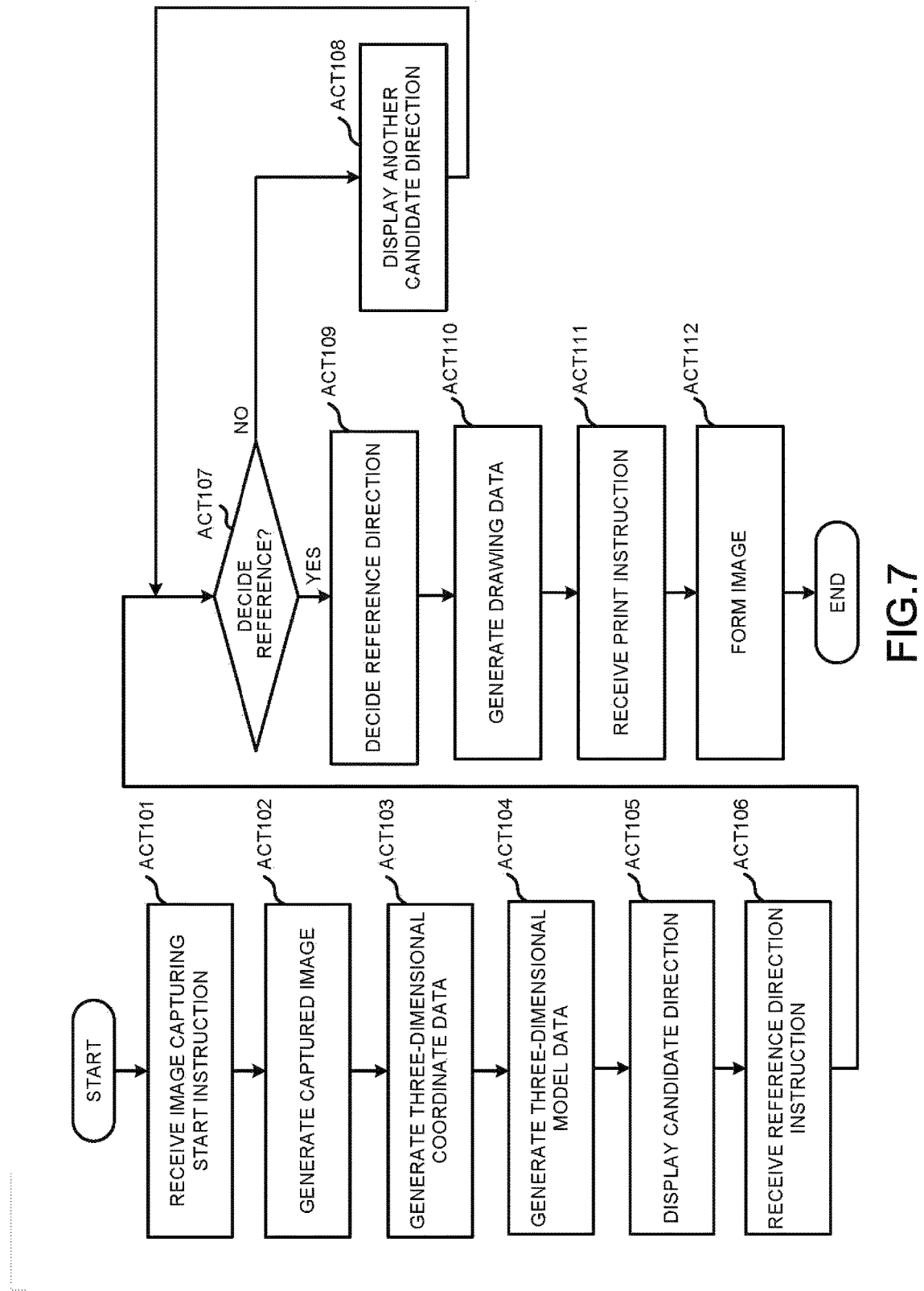
FIG. 7 is a flowchart illustrating procedures of a processing by the image forming apparatus 1 according to the first embodiment.

FIG. 7 is a flowchart illustrating procedures of a processing by the image forming apparatus 1 according to the first embodiment. The object is previously arranged on the stand 152 of the three-dimensional reading section 150. The control panel 120 of the image forming apparatus 1 receives an input relating to an image capturing start instruction from the user (ACT 101). The sensor 151 photographs the object arranged on the stand 152 to generate a captured image (ACT 102). The model data generation section 153 generates the three-dimensional coordinate data on the basis of the captured image (ACT 103). The model data generation section 153 generates the three-dimensional model data on the basis of the three-dimensional coordinate data (ACT 104). The drawing data generation section 171 selects one candidate direction from a plurality of candidate directions. The drawing data generation section 171 may display the image for displaying the three-dimensional model data from the candidate direction on the display 110 (ACT 105). The control panel 120 receives an input relating to decision of the reference direction from the user (ACT 106). The drawing data generation section 171 determines whether or not the input is a reference decision (ACT 107). If the input is not the reference decision (NO in ACT 107), the drawing data generation section 171 displays an image for displaying the three-dimensional model data from another candidate direction on the display 110 and returns to the processing in ACT 106 (ACT 108). If the input is the reference decision (YES in ACT 107), the drawing data generation section 171 decides the candidate direction displayed on the display 110 as the reference direction (ACT 109). The drawing data generation section 171 generates the drawing data on the basis of the three-dimensional model data and the reference direction (ACT 110). The control panel 120 receives an input relating to the print instruction from the user (ACT 111). The drawing data generation section 171 outputs the drawing data to the printer section 130. The printer section 130 forms an image on the sheet on the basis of the drawing data (ACT 112).

The user can use the function as the multifunction peripheral and the function as the three-dimensional scanner through one image forming apparatus 1 with the foregoing configuration. Thus, it is possible that the user who does not often use the three-dimensional scanner is also motivated to possess the image forming apparatus 1. At the time of using the function of the three-dimensional scanner and the function of the multifunction peripheral, it is not necessary to purchase devices respectively having those functions. Thus, it is possible to make the most use of the space such as an office.

In the image forming apparatus 1, it is possible to deliver the three-dimensional model data generated by the three-dimensional scanner to the function of the image forming apparatus via a bus line in the apparatus. Thus, the three-dimensional model data can be easily delivered to the function of the image forming apparatus without passing through a portable recording medium such as a USB memory and a network.

The image forming apparatus 1 easily generates the drawing data based on the three-dimensional model data generated by the three-dimensional scanner. The generated drawing data can be easily used to form the image on the sheet in the image forming apparatus 1. Thus, it is easily to generate the sheet on which the drawing is printed for a predetermined object.

In the image forming apparatus 1, the information relating to the dimension is assigned to the drawing data. Thus, it is possible for the user to easily acquire the information relating to the dimension of the object.

Second Embodiment

Figure 8:
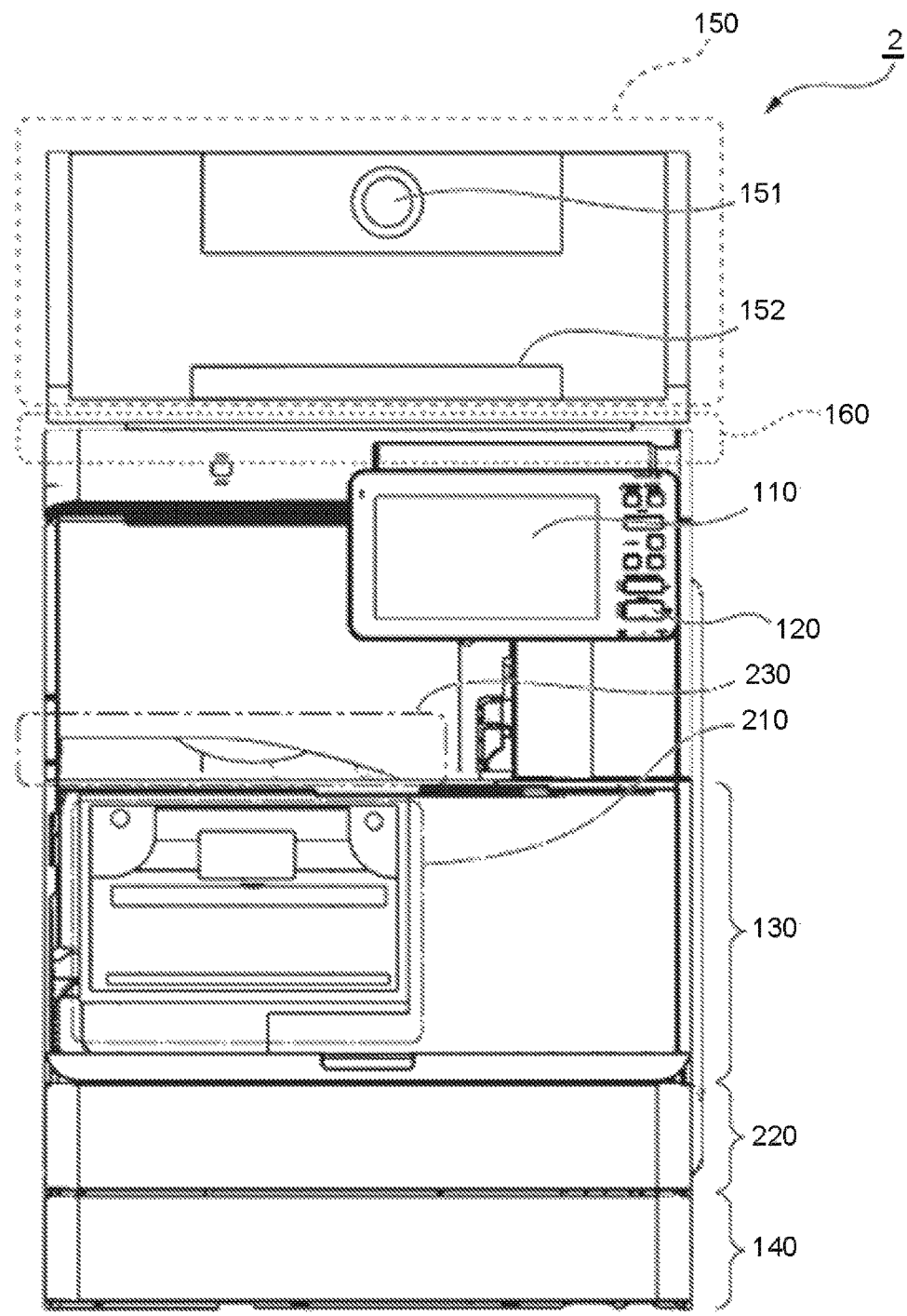
FIG. 8 is a block diagram illustrating an example of the whole configuration of an image forming apparatus 2 according to a second embodiment.

Next, an image forming apparatus 2 according to the second embodiment is described with reference to the accompany drawings. FIG. 8 is a diagram illustrating an example of the whole configuration of the image forming apparatus 2 according to the second embodiment. The image forming apparatus 2 is, for example, a multifunction peripheral. The image forming apparatus 2 is different from the first embodiment in the point that the image forming apparatus 2 further comprises a molding section 210 and a molding material housing section 220, and the other configurations are the same. Hereinafter, only the point different from the first embodiment is described.

Figure 9:
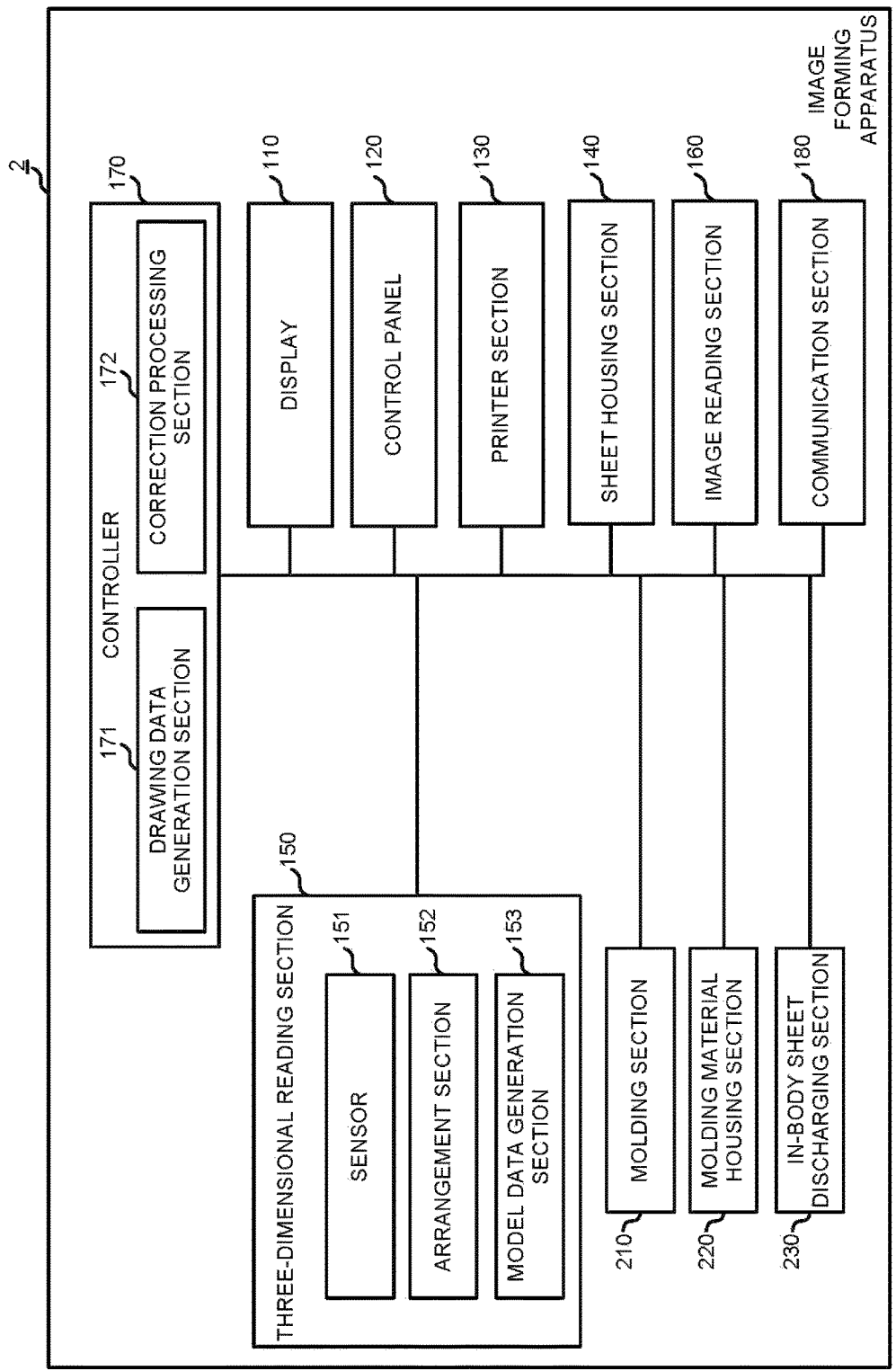
FIG. 9 is a block diagram illustrating an example of functional components of the image forming apparatus 2 according to the second embodiment.

FIG. 9 is a block diagram illustrating an example of functional components of the image forming apparatus 2 according to the second embodiment. The molding section 210 is a device capable of molding a three-dimensional molded object. The molding section 210 molds the three-dimensional molded object on the basis of the three-dimensional model data. The molding section 210 acquires various molding material necessary for molding from the molding material housing section 220. The molding section 210 outputs a molding completion notification if the molding is completed. The molding section 210 may use an optional molding method as long as the molding section 210 can mold the three-dimensional molded object with the molding method such as a fused deposition modeling method or a binder jetting method. The molding completion notification may be executed with an optional notification method as long as the user is aware of the completion of the molding such as ringing of a buzzer or lighting of a lamp. The molding section 210 is desired to be arranged at a position which does not protrude from the image forming apparatus 2. For example, the molding section 210 may be arranged at a lower part of an in-body sheet discharging section 230.

The molding material housing section 220 houses the molding material used in the three-dimensional molding by the molding section 210. The molding material refers to material used for molding the molded object. The molding material is, for example, ABS (Acrylonitrile Butadiene Styrene) like resin, PP (polypropylene) like, rubber like and a paper. The molding material housing section 220 may house a plurality of the molding material. The molding material housing section 220 may house optional material as long as the material is the molding material.

The sheet on which the image is formed by the printer section 130 is discharged to the in-body sheet discharging section 230. The in-body sheet discharging section 230 supports the arranged sheet. The in-body sheet discharging section 230 is arranged at a position which does not protrude from the image forming apparatus 2. A space for accumulating the discharged sheet is arranged over the in-body sheet discharging section 230.

Figure 10:
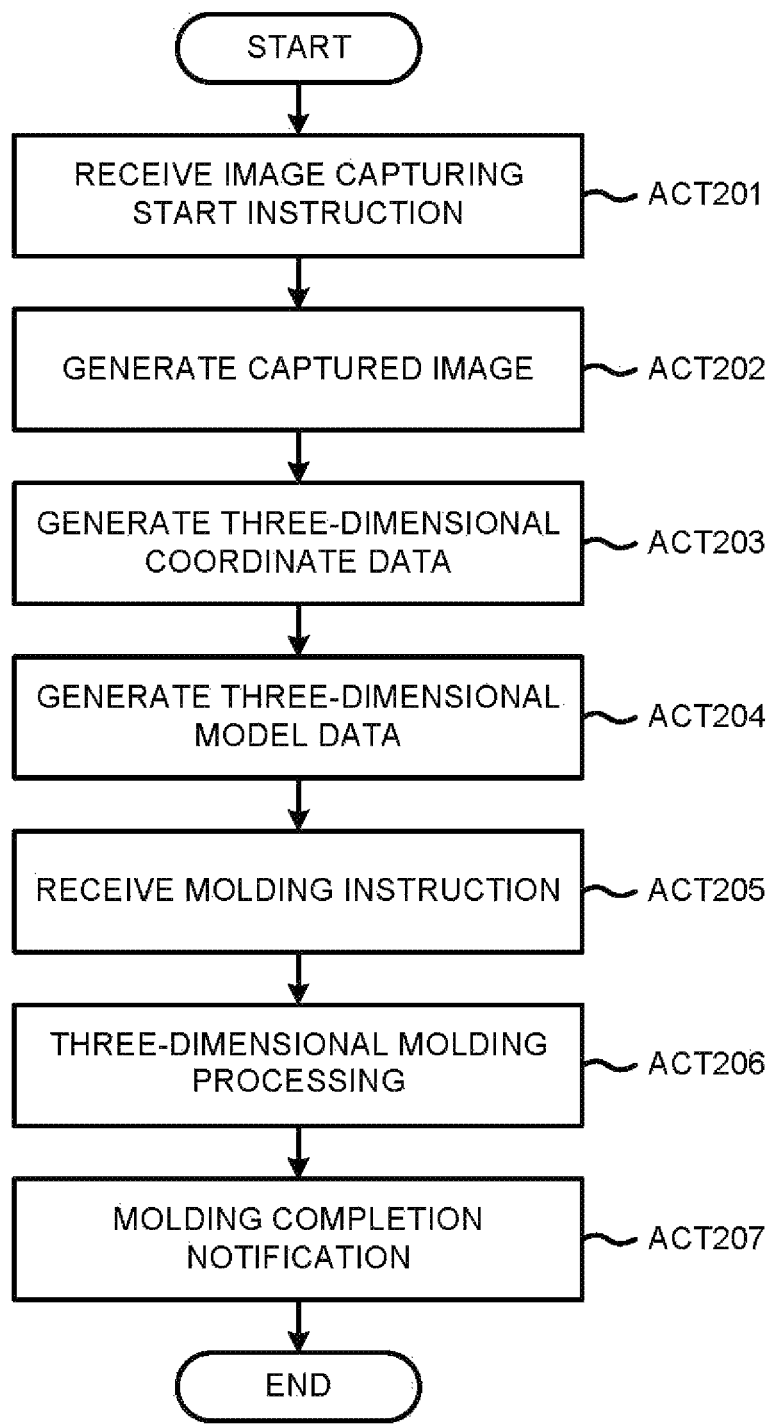
FIG. 10 is a flowchart illustrating procedures of a processing by the image forming apparatus 2.

FIG. 10 is a flowchart illustrating procedures of a processing by the image forming apparatus 2. The object is previously arranged on the stand 152 of the three-dimensional reading section 150. The control panel 120 of the image forming apparatus 2 receives an input relating to an image capturing start instruction from the user (ACT 201). The sensor 151 photographs the object arranged on the stand 152 to generate a captured image (ACT 202). The model data generation section 153 generates the three-dimensional coordinate data on the basis of the captured image (ACT 203). The model data generation section 153 generates the three-dimensional model data on the basis of the three-dimensional coordinate data (ACT 204). The control panel 120 receives an input relating to a molding instruction from the user (ACT 205). The molding section 210 molds the three-dimensional molded object on the basis of the three-dimensional model data (ACT 206). The molding section 210 outputs the molding completion notification if the molding is completed (ACT 207).

In the image forming apparatus 2 with the foregoing configuration, the user can place the image forming apparatus 2 if there is the same space as the conventional image forming apparatus. Thus, the user can install the image forming apparatus 2 without newly guaranteeing the space. Thus, there is no need to go out of a workshop to mold the three-dimensional molded object. Thus, a job can be more efficiently executed than before.

The image forming apparatus 2 of the present embodiment may receive the three-dimensional model data from an information processing apparatus via the communication section 180 to mold the three-dimensional molded object. With such a configuration, the user can mold the three-dimensional molded object if there is the three-dimensional model data. Thus, if the three-dimensional model data is created with a CAD, the three-dimensional molded object can be molded. Thus, the job can be more efficiently executed.

The controller 170 of the embodiment may execute a molding instruction for magnifying or minifying the three-dimensional molded object at the predetermined magnification. The predetermined magnification is, for example, twice, five times, half or one fifth. The predetermined magnification may be optional magnification. With such a configuration, the user can grasp details of the object in detail, and the molding material can be saved.

In an embodiment, an image forming apparatus comprises a three-dimensional reading section comprising an arrangement section where a target object is arranged, a sensor configured to acquire three-dimensional information relating to a three-dimensional shape of the object arranged on the arrangement section, and a model data generation section configured to generate three-dimensional model data indicating the three-dimensional shape of the object on the basis of the three-dimensional information; and a molding section configured to mold a three-dimensional molded object on the basis of the three-dimensional model data.

In another embodiment, the three-dimensional reading section is detachable from the image forming apparatus.

In yet another embodiment, the image forming apparatus further comprises a communication section configured to communicate with another information processing apparatus via a communication line, wherein the communication section sends the three-dimensional model data to the information processing apparatus.

In still yet another embodiment, the image forming apparatus further comprises a communication section configured to communicate with another information processing apparatus via a communication line, wherein the communication section receives three-dimensional model data from the information processing apparatus, and the molding section molds a three-dimensional molded object on the basis of the received three-dimensional model data.

In still yet another embodiment, the image forming apparatus further comprises a controller configured to execute instruction for molding the three-dimensional molded object by magnifying or minifying the three-dimensional molded object at predetermined magnification, wherein the molding section molds the three-dimensional molded object by magnifying or minifying the three-dimensional molded object at the predetermined magnification according to the instruction.

In still yet another embodiment, the molding section molds the three-dimensional molded object with a fused deposition modeling method.

In still yet another embodiment, the molding section molds the three-dimensional molded object with a binder jetting method.

In another embodiment, an image forming apparatus comprises a three-dimensional reader comprising an arrangement section where a target object is arranged, a sensor configured to acquire three-dimensional information relating to a three-dimensional shape of the object arranged on the arrangement section, and a model data generator configured to generate three-dimensional model data indicating the three-dimensional shape of the object on the basis of the three-dimensional information; and a molding section configured to mold a three-dimensional molded object on the basis of the three-dimensional model data.

In yet another embodiment, in the image forming apparatus, the three-dimensional reader is detachable from the image forming apparatus.

In still yet another embodiment, the image forming apparatus further comprises a communication section configured to communicate with another information processing apparatus via a communication channel. The communication section can send the three-dimensional model data to the information processing apparatus.

In another embodiment, the image forming apparatus further comprises a communication section configured to communicate with another information processing apparatus via a communication channel, and the communication section receives three-dimensional model data from the information processing apparatus, and the molding section molds a three-dimensional molded object on the basis of the received three-dimensional model data.

In yet another embodiment, the image forming apparatus further comprises a controller configured to execute instruction for molding the three-dimensional molded object by magnifying or minifying the three-dimensional molded object at predetermined magnification, the molding section molding the three-dimensional molded object by magnifying or minifying the three-dimensional molded object at the predetermined magnification according to the instruction.

Alternatively, in the image forming apparatus, the molding section molds the three-dimensional molded object with a fused deposition modeling method. Still alternatively, the molding section molds the three-dimensional molded object with a binder jetting method.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
   a three-dimensional reader; and
   a processor that executes instructions to perform operations, comprising:
   acquiring three-dimensional information relating to a three-dimensional shape of a target object arranged within the three-dimensional reader;
   generating three-dimensional model data indicating the three-dimensional shape of the target object based on the three-dimensional information, wherein the three-dimension model data is standard triangulated language data representative of the three-dimensional shape of the target object;
   generating drawing data comprising data of a two-dimensional drawing formed by projecting the target object on a plane surface on a basis of the three-dimensional model data; and
   forming, by a printer device, an image on a sheet on the basis of the drawing data.

2. The image forming apparatus according to claim 1, wherein,
   the three-dimensional reader is detachable from the image forming apparatus.

3. The image forming apparatus according to claim 1, wherein the operations further comprise:
   correcting deviation of a position or an angle of the target object for the three-dimensional model data.

4. The image forming apparatus according to claim 3, wherein the operations further comprise:
   receiving an operation input by a user, wherein
   correction is carried out through rotationally moving the three-dimensional model data according to a movement instruction indicating that the three-dimensional model data is rotationally moved centering on predetermined three-dimensional coordinate axes based on the operation.

5. The image forming apparatus according to claim 3, wherein the operations further comprise:
   moving the three-dimensional model data in such a manner that a predetermined surface and a surface of the three-dimensional model data are arranged in parallel.

6. The image forming apparatus according to claim 3, wherein the operations further comprise:
   generating drawing data based on one reference direction selected from a plurality of candidate directions for the three-dimensional model data.

7. The image forming apparatus according to claim 1, wherein the operations further comprise:
   communicating with a information processing apparatus via a communication channel, wherein
   the three-dimensional model data or the drawing data is sent to the information processing apparatus.

8. The image forming apparatus according to claim 1, wherein the operations further comprise:
   communicating with a information processing apparatus via a communication channel, wherein
   three-dimensional model data is received from the information processing apparatus, and
   drawing data is generated based on the three-dimensional model data that is received.

9. The image forming apparatus according to claim 1, wherein the operations further comprise:
   assigning information relating to a dimension of the target object to the drawing data.

10. The image forming apparatus according to claim 1, wherein the operations further comprise:
    executing an instruction for printing drawing data by magnifying or minifying the drawing data at a predetermined magnification or a predetermined minification, wherein
    the printer device forms an image on the sheet through magnifying or minifying the drawing data at the magnification based on the instruction.

11. An image forming method, comprising:
    acquiring three-dimensional information relating to a three-dimensional shape of a target object;
    generating three-dimensional model data indicating the three-dimensional shape of the target object on a basis of the three-dimensional information, wherein the three-dimension model data is standard triangulated language data representative of the three-dimensional shape of the target object;
    generating drawing data comprising data of a two-dimensional drawing formed by projecting the target object on a plane surface on a basis of the three-dimensional model data; and forming an image on a sheet on a basis of the drawing data.

12. The image forming method according to claim 11, further comprising:
correcting deviation of a position of the target object for the three-dimensional model data.

13. The image forming method according to claim 11, further comprising:
correcting deviation of an angle of the target object for the three-dimensional model data.

14. The image forming method according to claim 13, further comprising:
receiving an operation by a user, wherein
correcting deviation comprises rotationally moving the three-dimensional model data according to a movement instruction indicating that the three-dimensional model data is rotationally moved centering on predetermined three-dimensional coordinate axes.

15. The image forming method according to claim 13, wherein,
correcting deviation comprises moving the three-dimensional model data in such a manner that a predetermined surface and a surface of the three-dimensional model data are arranged in parallel.

16. The image forming method according to claim 13, further comprising:
generating drawing data on a basis of one reference direction selected from a plurality of candidate directions for the three-dimensional model data.

17. The image forming method according to claim 11, further comprising:
communicating with another information processing apparatus via a communication channel; and
sending the three-dimensional model data or the drawing data to an information processing apparatus.

18. The image forming method according to claim 11, further comprising:
communicating with another information processing apparatus via a communication channel;
receiving three-dimensional model data from another information processing apparatus, and
generating drawing data on a basis of the received three-dimensional model data.

19. The image forming method according to claim 11, further comprising:
assigning information relating to a dimension of the target object to the drawing data.

20. The image forming method according to claim 11, further comprising:
executing an instruction for printing drawing data by magnifying or minifying the drawing data at a predetermined magnification or a predetermined minification; and
forming an image on a sheet through magnifying or minifying the drawing data at the magnification on a basis of the instruction.

* * * * *